(12) United States Patent
Rha et al.

(10) Patent No.: US 9,077,982 B2
(45) Date of Patent: Jul. 7, 2015

(54) DEVICE AND METHOD FOR DISPLAYING 3D IMAGE AND DEVICE AND METHOD FOR RECEIVING 3D IMAGE BY USING LIGHT OF DIFFERENT WAVELENGTHS

(75) Inventors: Beom-kyun Rha, Seongnam-si (KR); Tae-young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 259 days.

(21) Appl. No.: 13/617,913

(22) Filed: Sep. 14, 2012

(65) Prior Publication Data
US 2013/0135296 A1   May 30, 2013

(30) Foreign Application Priority Data

Nov. 29, 2011 (KR) ........................ 10-2011-0126325

(51) Int. Cl.
    *H04N 13/04*   (2006.01)
(52) U.S. Cl.
    CPC ......... *H04N 13/0434* (2013.01); *H04N 13/045* (2013.01); *H04N 13/0497* (2013.01)
(58) Field of Classification Search
    None
    See application file for complete search history.

(56) References Cited

U.S. PATENT DOCUMENTS

| 5,682,506 | A | * | 10/1997 | Corby et al. | 345/419 |
| 6,002,518 | A | * | 12/1999 | Faris | 359/465 |
| 2011/0286093 | A1 | | 11/2011 | Bittner | |

FOREIGN PATENT DOCUMENTS

GB         2 453 751 A    4/2009

OTHER PUBLICATIONS

Communication, dated Dec. 16, 2013, issued by the European Patent Office in counterpart European Patent Application No. 12190953.5.
Holliman, Nicolas S., et al., "Three-Dimensional Display: A Review and Applications Analysis," IEEE Transactions on Broadcasting, vol. 57, No. 2, Jun. 1, 2011, pp. 362-371.
Son, Jung-Young, et al., "Recent Developments in 3-D Imaging Technologies, " Journal of Display Technology, vol. 6, No. 10, Oct. 1, 2010, pp. 394-403.

* cited by examiner

*Primary Examiner* — Said Broome
(74) *Attorney, Agent, or Firm* — Sughrue Mion, PLLC

(57) ABSTRACT

A device and method for displaying a 3D image includes a multi-image generation unit generating a multi-image by combining left-eye and right-eye images for each content of a plurality of different content; a display panel displaying the multi-image; and a backlight providing light having different wavelengths for the corresponding different content included in the multi-image to the display panel when the multi-image is displayed.

14 Claims, 7 Drawing Sheets

DEVICE AND METHOD FOR DISPLAYING 3D IMAGE AND DEVICE AND METHOD FOR RECEIVING 3D IMAGE BY USING LIGHT OF DIFFERENT WAVELENGTHS

CROSS-REFERENCE TO RELATED APPLICATION

This application claims priority from Korean Patent Application No. 10-2011-0126325, filed on Nov. 29, 2011, in the Korean Intellectual Property Office, the disclosure of which is incorporated herein by reference in its entirety.

BACKGROUND

1. Field

Apparatuses and methods consistent with exemplary embodiments relate to displaying a three dimensional (3D) image and receiving a 3D image, and more particularly to providing a multi-view by generating different types of images as light having different wavelengths in a single 3D image display device.

2. Description of the Related Art 3D image implementation methods generally use the binocular disparity of viewers. The 3D image implementation methods using the binocular disparity may include a glasses type that uses polarized glasses, shutter glasses, or the like, and a non-glasses type that does not use separate glasses through attachment of a separate lenticular lens or the like to a display device. Typically, the former is called stereoscopy, and the latter is called autostereoscopy.

More specifically, the glasses type 3D imaging method may include a polarizing filter type that uses principles of optics in stereoscopic projection, and an LCD shutter type that alternately opens and closes left and right scenes of glasses and converts an image into a left-eye image and a right-eye image.

In the polarizing filter type stereoscopy, a polarizer is provided on a surface of a display device so as to emit light that is parallel to projection axes (or polarization axes) of polarizing filters provided for a left eye and a right eye of the polarized glasses. The polarizer includes a plurality of minute polarizers having projection axes that are parallel to the projection axes of the polarizing filters provided for the left eye and the right eye of the polarized glasses. Accordingly, the left eye and the right eye of the polarized glasses receive the different polarized light emitted from the display device, and due to a difference between visual fields that are received by both eyes of a user who wears the polarized glasses, the user appreciates the 3D image.

However, the 3D image implementation methods in the related art merely enable the users who wear the same type of glasses to view the same image provided from one 3D image display device. Accordingly, the related art does not provide a solution by which the different individuals, who desire to view different broadcasting images, can do so by using one 3D image display device, for example, at one's home.

SUMMARY

Exemplary embodiments address at least the above problems and/or disadvantages and other advantages not described above. Also, an exemplary embodiment is not required to overcome the disadvantages described above, and an exemplary embodiment may not overcome any of the problems described above.

One or more exemplary embodiments provide a device and method for displaying a 3D image and a device and method for receiving a 3D image, which can provide different kinds (or content) of images using light having different wavelengths.

According to an aspect of an exemplary embodiment, there is provided a device for displaying a 3D image including a multi-image generation unit generating a multi-image by combining left-eye and right-eye images for each content of a plurality of different content; a display panel displaying the multi-image; and a backlight providing light having different wavelengths for the different content included in the multi-image to the display panel when the multi-image is displayed.

The multi-image generation unit may generate the multi-image by mixing in the unit of a frame.

The multi-image generation unit may determine whether a multi-view request is input from a user, and may generate and output the multi-image if the multi-view request is input as the result of the determination.

The device may also include a lamp driving unit controlling the backlight to provide the light having different wavelengths to the display panel.

The backlight may include a first group of RGB light-emitting diodes (LEDs) providing a first wavelength and a second group of RGB LEDs providing a second wavelength.

The backlight may include RGB LEDs, and each of the RGB LEDs may dividedly provide a first wavelength and a second wavelength.

The device for displaying a 3D image may interlock with a plurality of user glasses, part of the user glasses may visually recognize a first image that is provided with the light having a first wavelength as the left-eye and right-eye images, and the remaining user glasses may visually recognize a second image that is provided with the light having a second wavelength as the left-eye and right-eye images.

According to another aspect of an exemplary embodiment, there is provided a device for receiving a 3D image, including: a color filter receiving a multi-image that is generated by combining left-eye and right-eye images for each content of a plurality of different content and transmitting one of light having different wavelengths when the multi-image is provided with the light having the different wavelengths for the different content; and a polarizing filter transmitting the multi-image as the left-eye and right-eye images.

The color filter may transmit white light in which red (R), green (G), and blue (B) are mixed, and wavelength bands of the red (R), green (G), and blue (B) may be divided into a first wavelength band and a second wavelength band, respectively.

According to another aspect of an exemplary embodiment, there is provided a method for displaying a 3D image, including: generating and outputting a multi-image by combining left-eye and right-eye images for each content of a plurality of different content; displaying the multi-image on a display panel; and providing light having different wavelengths for the different content included in the multi-image to the display panel when the multi-image is displayed.

The method for displaying a 3D image, may also include determining whether a multi-view request is input from a user, wherein the generating the multi-image generates the multi-image if the multi-view request is input.

The light having the different wavelengths may be provided to the display panel in the form of white light.

The white light may be formed through mixing of light of red (R), green (G), and blue (B) having a first wavelength band or through mixing of light of red (R), green (G), and blue (B) having a second wavelength band.

According to another aspect of an exemplary embodiment, there is provided a method for receiving a 3D image, including: receiving a multi-image that is generated by combining left-eye and right-eye images for each content of a plurality of different content and transmitting one of light having different wavelengths when the multi-image is provided with the light having the different wavelengths for the different content; and transmitting the multi-image as the left-eye and right-eye images.

The transmitting one of light may transmit one of the light by using a color filter.

One of the light transmitted through the color filter may be transmitted in the form of white light.

BRIEF DESCRIPTION OF THE DRAWINGS

The above and/or other aspects will become more apparent by describing certain exemplary embodiments, with reference to the accompanying drawings, in which.

DETAILED DESCRIPTION OF EXEMPLARY EMBODIMENTS

Figure 1:
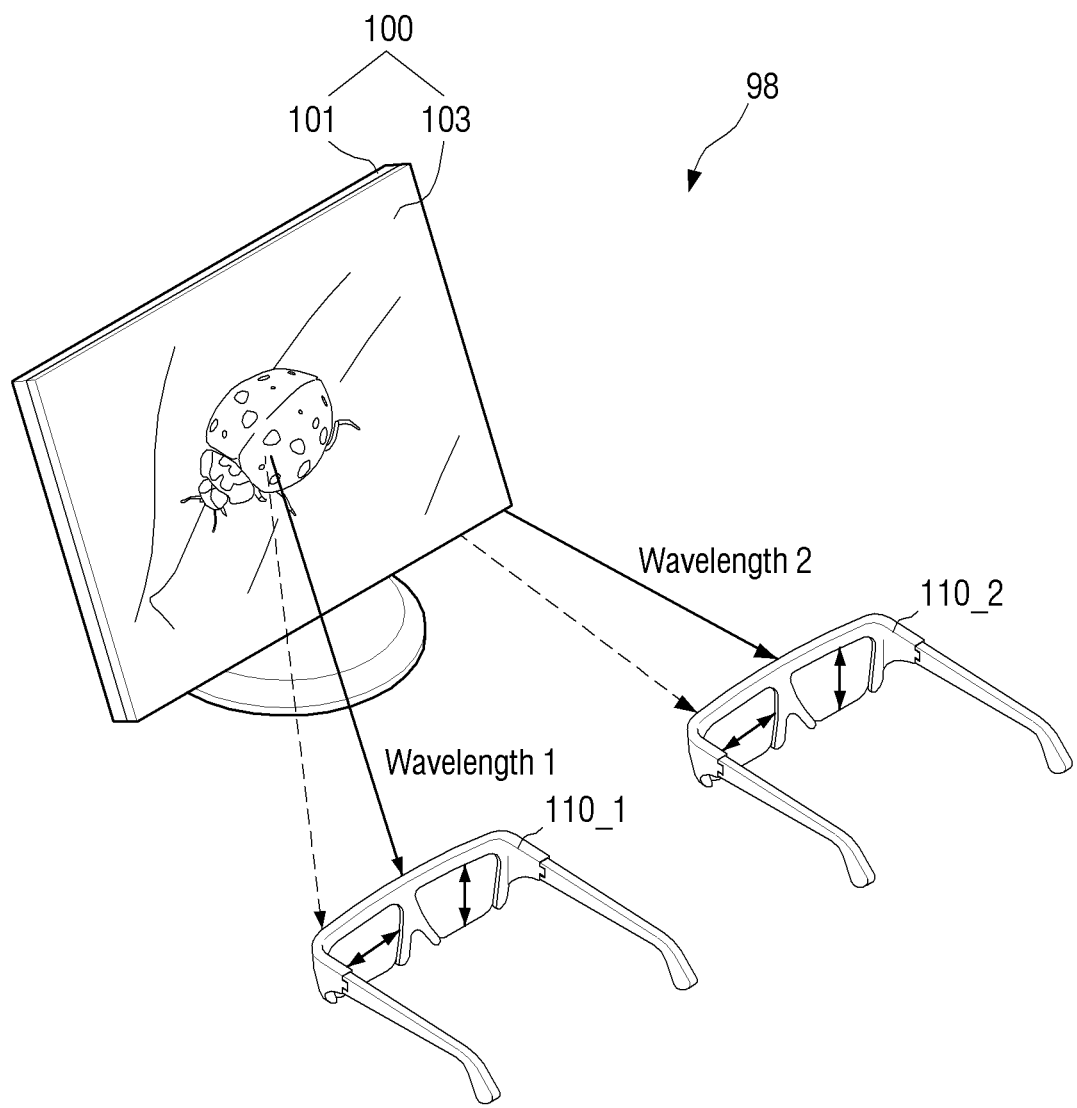
FIG. 1 is a view illustrating a 3D image implementation system according to an exemplary embodiment.

Hereinafter, certain exemplary embodiments are described in detail below with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. However, exemplary embodiments can be carried out without those specifically defined matters. Also, well-known functions or constructions are not described in detail since they would obscure the exemplary embodiments with unnecessary detail.

Figure 2:
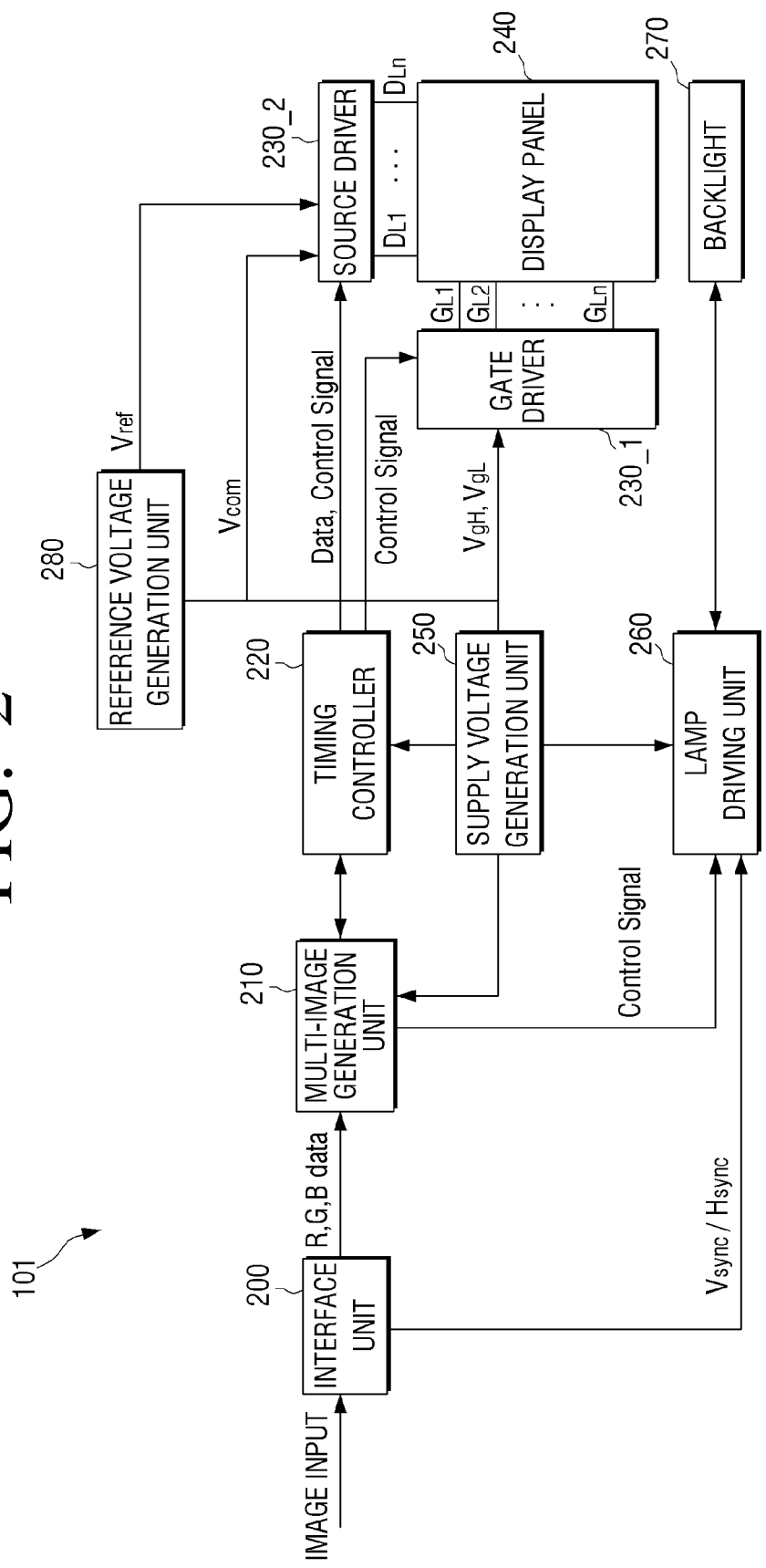
FIG. 2 is a block diagram illustrating the configuration of a device for displaying a 3D image according to an exemplary embodiment.
Figure 3:
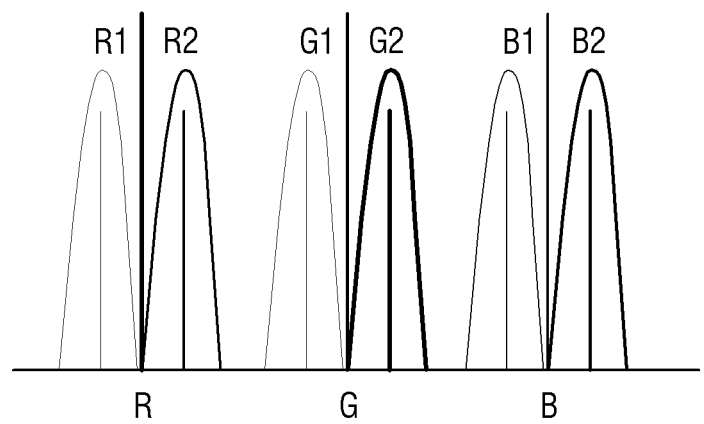
FIG. 3 is a diagram illustrating a wavelength separation process.

FIG. 1 is a view illustrating a 3D image implementation system according to an exemplary embodiment, FIG. 2 is a block diagram illustrating the configuration of a device for displaying a 3D image according to an exemplary embodiment, and FIG. 3 is a diagram illustrating a wavelength separation process of a backlight in FIG. 1.

As illustrated in FIGS. 1 and 2, a 3D image implementation system 98 according to an exemplary embodiment includes a device 100 for displaying a 3D image, first user glasses 110_1 and second user glasses 110_2. For example, the device 100 for displaying a 3D image includes an image display device 101 and a polarizing member 103.

First, the image display device 101 according to an exemplary embodiment simultaneously or alternately provides images of different programs (or content) input from an external source or an external device, for example, a nature documentary image as a first image and a drama image as a second image. For example, the "simultaneous" providing of images means that part of a unit frame provides the first image and the remaining part provides the second image. Further, the "alternate" providing of images means that in the case where the image display device 101 is driven at 240 Hz, 120 frames provide the first image and the remaining 120 frames provide the second image.

When the first image and the second image are mixed, the image display device 101 may additionally generate left-eye and right-eye images for the respective images in order to implement a 3D image. For example, in the case of capturing and providing the left-eye and right-eye images through a camera, for application of a polarizing type according to an exemplary embodiment, a unit frame may be formed through aggregation of pixel data of odd-numbered lines of the left-eye image and pixel data of even-numbered lines of the right-eye image, and then a unit frame may be formed through aggregation of pixel data of even-numbered lines of the left-eye image and pixel data of odd-numbered lines of the right-eye image. In the case of receiving a two-dimensional (2D) image, the image display device 101 may generate left-eye and right-eye images of respective unit-frame images and then regenerate the unit-frame images to meet the polarizing type as described above. Since the method for generating the left-eye and right-eye images may be diversely changed as described above, it is not specially limited to that as described above according to an exemplary embodiment.

Further, in the case of simultaneously or alternately displaying images of different content programs, the image display device 101 provides light having different wavelength bands that correspond to the respective program images through a backlight 270. For example, if it is assumed that images of different programs are alternately displayed, the image display device 101 provides, through the backlight 270, the light having a first wavelength when a first image is output, and provides the light having a second wavelength when a second image is output, as described in greater detail below.

On the other hand, since it is possible to control the polarizing member 103 in an active manner rather than in a passive manner, the polarizing member 103 may serve as so-called an active retarder or a pattern retarder. For example, the polarizing member 103 includes a liquid crystal layer. The polarizing member 103, as described above may be separately formed as an independent device to be attached to the image display device 101 or may be formed integrally with the image display device 101. The polarizing member 103 separates a multi-image that is implemented by the image display device 101 into left-eye images and right-eye images of the first and second user glasses 110_1 and 110_2 to output the separated images through control of the liquid crystal layer for horizontal lines or vertical lines using driving voltages having different voltage levels. At this time, in outputting left-eye and right-eye images in the form of horizontal lines, the polarizing member 103 may output the left-eye and right-eye images with their positions changed. In other words, if the left-eye image is output as a first horizontal line in a first frame, the right-eye image may be output as a first horizontal line in a second frame. In performing such an operation, the polarizing member 103 may be controlled by the image display device 101.

For example, in the case where the polarizing member 103 outputs the left-eye and right-eye images in the form of horizontal lines, it is possible to vertically polarize and output the image of the odd-numbered lines of the horizontal lines and to horizontally polarize and output the image of the even-numbered lines, and vice versa. Further, it is possible to circularly polarize and output the image of the odd-numbered lines of the horizontal lines in a clockwise direction and to circularly polarize and output the image of the even-numbered lines in a counterclockwise direction. Further, it is possible to linearly polarize the image of the odd-numbered lines of the horizontal lines and to circularly polarize the image of the even-numbered lines. Further, any combinations thereof are contemplated.

The first and second user glasses 110_1 and 110_2 are a kind of 3D image receiving device, and, for example, may be polarized glasses. If the left eye can visually recognize the horizontally polarized image, the right eye can visually recognize the vertically polarized image, and vice versa. Further, the first and second user glasses 110_1 and 110_2 may be formed so that the left eye and the right eye visually recognize the images that are circularly polarized in the clockwise and counterclockwise directions, respectively, and further may be formed so that the left eye and the right eye visually recognize the linearly polarized image and the circularly polarized image, respectively. In an exemplary embodiment, the polarization type for recognizing the image is not specially limited.

Further, the first and second user glasses 110_1 and 110_2 according to an exemplary embodiment enables viewers to view stereoscopic images, respectively, through simultaneous application of a color filter and a polarizing filter such as a Firs-type Patterned Retarder (FPR) and transmission of different kinds of images that are provided from the device 100 for displaying a 3D image with light having different wavelength bands. For example, the first user glasses 110_1 enables the viewers to view one desired image through transmission of a first image that is provided with the light having the first wavelength, and the second user glasses 110_2 enables the viewers to view the other desired image through transmission of a second image that is provided with the light having the second wavelength.

Referring to FIG. 2, the image display device 101 is described in more detail. The image display device 101 according to an exemplary embodiment may include at least one of an interface unit 200, a multi-image generation unit 210, a timing controller 220, a gate driver 230_1, a source driver 230_2, a display panel 240, a supply voltage generation unit 250, a lamp driving unit 260, a backlight 270, and a reference voltage generation unit 280. For example, the interface unit 200 and the multi-image generation unit 210 may be configured as separate devices.

First, the interface unit 200 serves to properly convert and output image data input from an external source or an external device to meet the resolution of the image display device 101 as a video board such as a graphic card. For example, the image data may be 8-bit RGB video data, and the interface unit 200 generates control signals, such as a clock signal DCLK, vertical and horizontal synchronous signals Vsync and Hsync, to meet the resolution of the image display device 101. Further, the interface unit 200 provides the image data to the multi-image generation unit 210 and provides the vertical and horizontal synchronous signals to the lamp driving unit 260, so that the backlight 270 is operated in synchronization with the image when the image is implemented on the display panel 240.

The multi-image generation unit 210 generates different kinds of images that are provided from the external source or external device to match a frame rate. In other words, if the image display device 101 has a frame rate of 60 Hz, the multi-image may be generated in a manner that a first image is generated for 30 frames and a second image is generated for the remaining 30 frames. It may be also possible that the first image is generated for 40 frames and the second image is generated for the remaining 20 frames. Further, the image display device 101 according to an exemplary embodiment may have different frame rates, for example, the frame rates of 120 Hz and 240 Hz, and may generate different types of multi-images.

In the case where the image display device 101 simultaneously provides a plurality of program images, the multi-image generation unit 210 may divide a unit frame into a plurality of regions and provide different program images. For example, the unit frame may be divided onto two regions, and a first image may be provided in the first region and a second image may be provided in the second region.

In the above-described process, the multi-image generation unit 210 may additionally generate a left-eye image and a right-eye image to implement a 3D image. In additionally generating the left-eye image and the right-eye image, the left-eye image and the right-eye image may be provided by using the camera, or an input 2D image may be generated as the left-eye image and the right-eye image. For example, in the case where a 3D image is provided, for application of the polarizing type according to an exemplary embodiment, the multi-image generation unit 210 may form a unit frame through aggregation of pixel data of odd-numbered lines of the left-eye image and pixel data of even-numbered lines of the right-eye image, and then may form a unit frame through aggregation of pixel data of the remaining even-numbered lines of the left-eye image and pixel data of the odd-numbered lines of the right-eye image.

Further, during a normal operation, the multi-image generation unit 210 may enable all viewers to view the same 3D image without providing an image for the multi-view, and only in the case where a separate request is input, it may generate and provide a multi-image for the multi-view. This may be performed, for example, in association with the timing controller 220 and the like that forms an interface with the user. In order to perform the above-described function, the image display device 101 may further include a switching unit for selecting output paths of the single image and the multi-image under the control of the timing controller 220 and a memory unit for storing the image.

The timing controller 220 provides the multi-image (or single image), which is provided from the multi-image generation unit 210, to the source driver 230_2, and controls the video data output from the source driver 230_2 using the control signal to implement the multi-image on the display panel 240. Further, the timing controller 220 controls the gate driver 230_1 to provide gate on/off voltages VgH and VgL provided from the supply voltage generation unit 250 to the display panel 240 for horizontal lines. For example, if the gate voltage VgH is applied to a first gate line GL1, the timing controller 220 controls the source driver 230_2 to apply the video data that corresponds to the amount of the first horizontal line. Further, the timing controller 220 turns on a second gate line GL2 and turns off the first gate line GL1, so that the video data that corresponds to the amount of the second horizontal line is applied from the source driver 230_2 to the display panel 240. Through this, the multi-image is displayed on the whole screen of the display panel 240.

The gate driver 230_1 receives the gate on/off voltages VgH and VgL generated by the supply voltage generation unit 250, and the received gate on/off voltages VgH and VgL are applied to gate lines GL1 to GLn of the display panel 240 in synchronization with the control signal provided from the timing controller 220. When the gate voltage is applied, the gate driver 230_1 sequentially provides the voltages for the horizontal lines under the control of the timing controller 220.

The source driver 230_2 may receive a common voltage Vcom generated by the supply voltage generation unit 250 and a reference voltage Vref (or gamma voltage) provided by the reference voltage generation unit 280, and may receive a multi-image from the timing controller 220. For example, the common voltage Vcom is provided to a common electrode of the display panel 240, and the reference voltage Vref is provided to a digital to analog (D/A) converter in the source driver 230_2 to be used when the gray scale of a color image is expressed. In other words, the multi-image that is generated by the multi-image generation unit 210 may be provided to the D/A converter, and digital information of RGB multi-image that is provided to the D/A converter is converted into an analog voltage that can express the gray scale of the color to be provided to the display panel 240. At this time, the RGB image, that is, the gray scale voltage may be provided to the display panel 240 in synchronization with the control signal of the timing controller 220.

Although not illustrated in detail, the display panel 240 includes a first substrate, a second substrate, and a liquid crystal layer interposed between the first substrate and the second substrate. On the first substrate, a plurality of gate lines GL1 to GLn and data lines DL1 to DLn, which cross each other to define pixel regions, are formed, and a pixel electrode is formed on each crossing pixel region. Further, on a portion of the pixel region, more accurately at a corner of the pixel region, a TFT (Thin Film Transistor) is formed. While the TFT is turned on, the liquid crystals are twisted as much as a difference between a voltage of the pixel electrode of the first substrate and a voltage applied to the common electrode of the second substrate to transmit the light of the backlight 270 having the first wavelength and the second wavelength.

The supply voltage generation unit 250 receives a commercial voltage, that is, an AC voltage of 110V or 220V, from the external source or external device, generates and outputs DC voltages having various levels. For example, the supply voltage generation unit 250 may generate and provide a voltage of 15 VDC as a gate-on voltage VgH for the gate driver 230_1, a voltage of 24 VDC for the lamp driving unit 260, and/or a voltage of 12 VDC for the timing controller 220. Further, the supply voltage generation unit 250 may generate and provide a voltage for driving the polarizing member 103.

The lamp driving unit 260 converts and supplies the voltage provided from the supply voltage generation unit 250 to the backlight 270. Further, the lamp driving unit 260 controls the RGB LEDs that constitute the backlight 270 to provide light having the first wavelength and the second wavelength. For example, the lamp driving unit 260 makes the RGB LEDs provide the light having the first wavelength or makes the RGB LEDs provide the light having the second wavelength. For example, the light provided from the RGB LEDs of the backlight 270 form white light. Further, the lamp driving unit 260 may include a feedback circuit that controls feedback of the driving current of the LEDs so that uniform light can be provided from the RGB LEDs of the backlight 270.

The backlight 270 may include a plurality of RGB LEDs, and may be any of an edge type in which RGB LEDs are arranged at edges of the display panel 240 and a direct type in which RGB LEDs are arranged on a front surface of a lower end of the display panel 240. In an exemplary embodiment, the backlight 270 may be divided into a first group of RGB LEDs providing the first wavelength and a second group of RGB LEDs providing the second wavelength. The backlight 270 operates the RGB LEDs under the control of the lamp driving unit 260 so that the RGB LEDs provide the light having different wavelengths that correspond to the different kinds of images.

For example, if the first image, for example, the nature documentary image, is displayed on the display panel 240, the backlight 270 provides the light having the first wavelength (R1, G1, B1) as shown in FIG. 3, while if the second image that is different from the first image is displayed on the display panel 240, the backlight 270 provides the light having the second wavelength (R2, G2, B2).

For example, the first wavelength and the second wavelength have different peak wavelengths in the respective wavelength bands of the RGB light as shown in FIG. 3.

For example, as seen in FIG. 3, if blue light has a wavelength band of 430 to 490 nm, the first wavelength and the second wavelength may have different peak wavelengths of 440 nm and 480 nm, respectively.

In order to provide different peak wavelengths as described above, the RGB LEDs may use a resin layer formed on the semiconductor chip as a filter, and in this case, the resin layer may further include a separate fluorescent material. Since diverse modifications are possible in this regard and an exemplary embodiment is not specially limited to such a resin layer.

The reference voltage generation unit 280 may be a gamma voltage generation unit. For example, if a voltage of 10 VDC is provided from the supply voltage generation unit 250, the reference voltage generation unit 280 divides the provided voltage into a plurality of voltages through dividing resistors and the like to provide the divided voltages to the source driver 230_2. Through this, the source driver 230_2 subdivides the provided voltages, for example, to express 256 gray scale levels of the RGB data.

On the other hand, the device 100 for displaying a 3D image according to an exemplary embodiment may be diversely modified. In other words, referring to FIG. 2, the lamp driving unit 260 may be integrally formed with the multi-image generation unit 210. Through this, the backlight 270 may directly receive the control signal from the multi-image generation unit 210 and provide the light having the first wavelength and the second wavelength. Further, the lamp driving unit 260 may be integrally formed with the backlight 270. However, an exemplary embodiment is not specially limited thereto.

FIG. 4 is a diagram illustrating a process of transmitting light having different wavelengths provided from the backlight in FIG. 2.

Figure 4A:
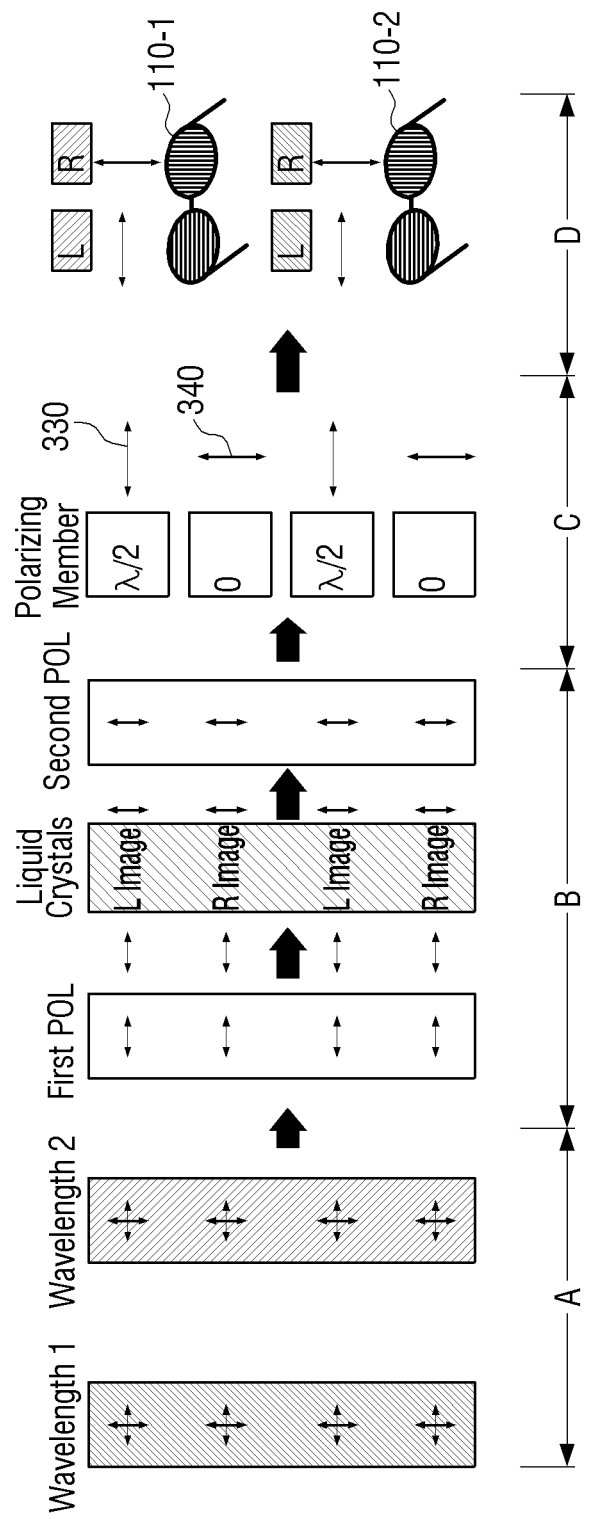
FIG. 4A is a diagram illustrating a process of transmitting light having different wavelengths.
Figure 4B:
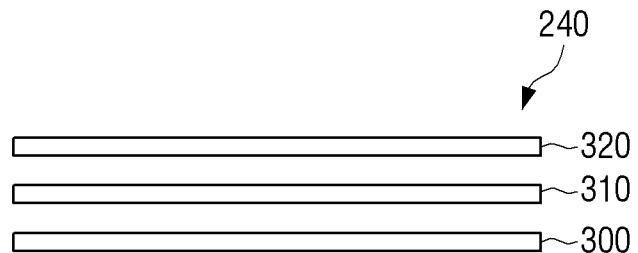
FIG. 4B is a block diagram illustrating the configuration of a display panel.

Referring to FIGS. 4A and 4B together with FIGS. 1 and 2, sections A, B, C, and D in FIG. 4 correspond to processes performed by the backlight 270, the display panel 240, the polarizing member 103, and the first and second user glasses 110_1 and 110_2, respectively.

In the case where the image display device 101 mixes and provides the first image and the second image, which are different from each other, by default according to an initial setting of the system or according to a user's request, the backlight 270 provides the light having the first wavelength in the case of outputting the first image, and the backlight 270 provides the light having the second wavelength in the case of outputting the second image (section A).

The light having the first wavelength or the second wavelength provided from the backlight 270 is input to the display panel 240. For example, a first polarizing layer (first POL) 300 that is provided on the rear side of the display panel 240 transmits a horizontally polarized light, a liquid crystal layer 310 changes the polarization direction, and a second polarizing layer (second POL) 320 transmits a vertically polarized light (section B).

As the vertically polarized light having the first wavelength and the second wavelength passes through the polarizing member 103 as a polarizing unit, odd-numbered horizontal lines provide the horizontally polarized light 330, of which the polarization direction is changed by 90 degrees, that is, by λ/2, and even-numbered horizontal lines provide the vertically polarized light 340 as it is (section C).

At this time, the first user glasses 110_1 visually recognizes the first image in a manner that the left eye thereof visually recognizes the horizontally polarized component of the light having the first wavelength, and the right eye thereof visually recognizes the vertically polarized component of the light having the first wavelength. Further, the second user glasses 110_2 visually recognizes the second image in a manner that the left eye thereof visually recognizes the horizontally polarized component of the light having the second wavelength, and the right eye thereof visually recognizes the vertically polarized component of the light having the second wavelength (section D).

In an exemplary embodiment, the first wavelength and the second wavelength are vertically and horizontally polarized through the polarizing unit such as the polarizing member 103. However, an exemplary embodiment is not specially limited thereto. For example, the polarizing unit may circularly polarize the image of the odd-numbered lines in a clockwise direction and may circularly polarize the image of the even-numbered lines in a counterclockwise direction, and vice versa. Further, the polarizing unit may linearly polarize the image of specified lines and may circularly polarize the image of the remaining lines.

Figure 5:
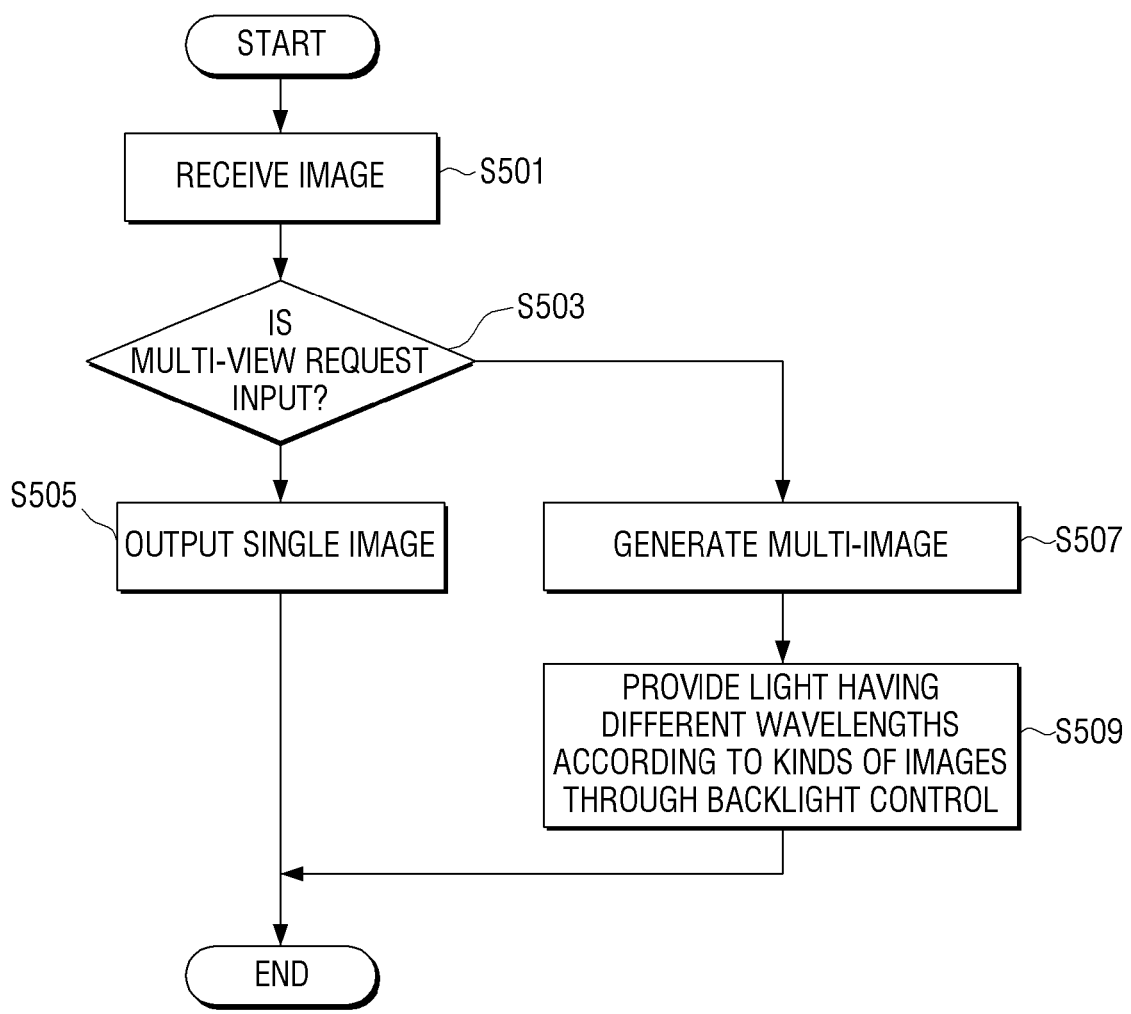
FIG. 5 is a diagram illustrating a method for displaying a 3D image according to an exemplary embodiment.

FIG. 5 is a diagram illustrating a method for displaying a 3D image according to an exemplary embodiment.

Referring to FIG. 5 together with FIGS. 1 and 2, the device for displaying a 3D image according to an exemplary embodiment receives first and second images of different programs from the external source or external device (S501). For example, if the first image is a nature documentary image, the second image may be a drama image. In order to receive the image of the different programs, the device 100 for displaying a 3D image may interlock with a set top box that provides images of a plurality of programs through one channel.

Then, the device 100 for displaying a 3D image determines whether a multi-view request is input from a user (S503). If the device 100 for displaying a 3D image is set by default to provide a multi-image, the above-described determination process may be omitted and the method may proceed to the operation S507.

If it is determined that the multi-view request is not input as the result of the determination or the default to provide a multi-image is not set, the device 100 for displaying a 3D image displays a single 3D image (S505). In other words, an image of a single program is displayed through the device 100 for displaying a 3D image.

If it is determined that the multi-view request is input from the user, the device 100 for displaying a 3D image generates a multi-image through mixing of the first and second images received (S507). For example, if the device 100 for displaying a 3D image has a frame rate of 240 Hz, the first image is displayed for the first 120 frames, and the second image is displayed for the remaining 120 frames. Of course, in order to form 240 frames, a unit frame may be formed in the order of first image→second image→first image→second image. Accordingly, in an exemplary embodiment, a method of forming the frames is not specially limited.

Further, the device 100 for displaying a 3D image may additionally generate left-eye and right-eye images for each image when the multi-image is generated. Since sufficient description has been made in this regard, further description thereof is omitted.

Further, the device 100 for displaying a 3D image provides light having different wavelengths through controlling the backlight 270 when the multi-image is implemented (S509). In other words, in the case of outputting the first image, the image is implemented with the light having the first wavelength, while in the case of outputting the second image, the image is implemented with the light having the second wavelength.

As described above, if the left-eye and right-eye images of the first and second images are output through the light having different wavelength bands, the first and second user glasses 110_1 and 110_2 can visually recognize the first image and the second image as the 3D images, respectively.

Figure 6:
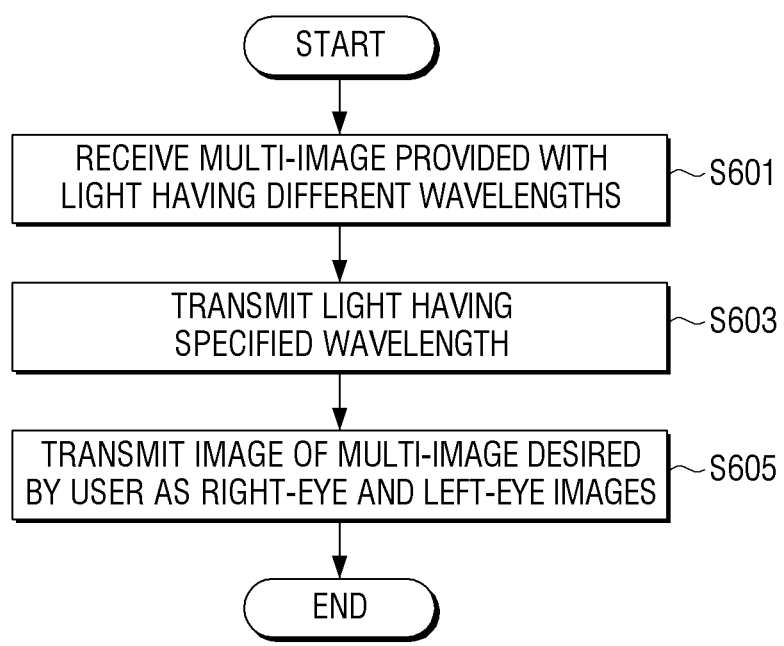
FIG. 6 is a diagram illustrating a method for receiving a 3D image according to an exemplary embodiment.

FIG. 6 is a diagram illustrating a method for receiving a 3D image according to an exemplary embodiment Referring to FIG. 6 together with FIG. 1, the first and second user glasses 110_1 and 110_2 according to an exemplary embodiment are a kind of device for receiving a 3D image, and receive the multi-image that is provided with the light having different wavelengths through the device 100 for displaying a 3D image (S601). For example, the first and second user glasses 110_1 and 110_2 alternately receive the first image that is provided at the first wavelength and the second image that is provided at the second wavelength.

At this time, the first and second user glasses 110_1 and 110_2 transmit the light having specified wavelengths through color filters having different characteristics (S603). In other words, if the first user glasses 110_1 transmits the light having the first wavelength, the second user glasses 110_2 may transmit the light having the second wavelength. For example, the light having the first wavelength and the second wavelength is white light that is generated through mixing of RGB light, of which the wavelength band is divided into two regions, respectively, by regions.

Further, the first and second user glasses 110_1 and 110_2 transmit the first or second image, respectively, having a desired wavelength of the multi-image that is provided as left-eye and right-eye images from the device 100 for displaying a 3D image through polarizing filters (S605).

As described above, the viewers can view respective images that are visually formed and transmitted through the first and second user glasses 110_1 and 110_2.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:
1. A device for displaying a three dimensional (3D) image, the device comprising:
   a multi-image generator comprising a processor configured to generate a multi-image by combining a left-eye image and a right-eye image for a first content and a second content of a plurality of different content;
   a backlight configured to provide a first light having a first wavelength and a second light having a second wavelength different from the first wavelength for corresponding first content and second content different from the first content included in the multi-image; and
   a display panel configured to display the multi-image comprising a first image of the first content and a second image of the second content different from the first image in response to receiving the provided first light or second light, respectively, wherein at least one of the first light and the second light having the first wavelength and the second wavelength, respectively, is provided to the display panel as white light.

2. The device for displaying a 3D image as claimed in claim 1, wherein the multi-image generator is configured to generate the multi-image by mixing images of the different content in a unit of a frame.

3. The device for displaying a 3D image as claimed in claim 1, wherein the multi-image generator is configured to determine whether a multi-view request is input from a user, and generate and output the multi-image if the multi-view request is input, as a result of a determination.

4. The device for displaying a 3D image as claimed in claim 1, further comprising:
a lamp driving unit which controls the backlight to provide the first light and the second light having the first wavelength and the second wavelength, respectively, to the display panel.

5. The device for displaying a 3D image as claimed in claim 1, wherein the backlight comprises:
a first group of red, green, blue (RGB) light-emitting diodes (LEDs) providing the first light having the first wavelength; and
a second group of RGB LEDs providing the second light having the second wavelength.

6. The device for displaying a 3D image as claimed in claim 1, wherein the backlight comprises red, green, and blue (RGB) LEDs, and
each of the RGB LEDs individually provides the first light having the first wavelength or the second light having the second wavelength.

7. The device for displaying a 3D image as claimed in claim 1, wherein the device for displaying the 3D image interlocks with a plurality of user glasses,
at least one of the plurality of the user glasses transmits the first image of the first content that is provided with the first light having the first wavelength as the left-eye and right-eye images, and
at least one of remaining user glasses transmits the second image of the second content that is provided with the second light having the second wavelength as the left-eye and right-eye images.

8. A device for receiving a three dimensional (3D) image, the device comprising:
a first glasses and a second glasses, each of the first glasses and the second glasses comprising:
a color filter configured to receive a multi-image that is generated by combining a left-eye image and a right-eye image for different content of a plurality of content and transmitting different wavelengths of light for corresponding different content when the multi-image is provided; and
a polarizing filter configured to transmit the multi-image as the left-eye and right-eye images.

9. The device for receiving a 3D image as claimed in claim 8, wherein the color filter is configured to transmit white light in which red (R), green (G), and blue (B) lights are mixed, and wavelength bands of the R, G, and B lights are divided into a first wavelength band and a second wavelength band, respectively.

10. A method for displaying a three dimensional (3D) image, the method comprising:
generating a multi-image by combining a left-eye image and a right-eye image for a first content and a second content of a plurality of different content;
providing a first light having a first wavelength and a second light having a second wavelength different from the first wavelength for corresponding first content and second content different from the first content included in the multi-image; and
displaying the multi-image comprising a first image of the first content and a second image of the second content different from the first image in response to receiving the provided first light or second light, respectively,
wherein at least one of the first light and the second light having the first wavelength and the second wavelength, respectively, is provided to the display panel as white light.

11. The method for displaying a 3D image as claimed in claim 10, further comprising determining whether a multi-view request is input from a user, prior to the generating,
wherein the multi-image is generated in response to the multi-view request being input.

12. The method for displaying a 3D image as claimed in claim 10, wherein the white light is formed by mixing red (R), green (G), and blue (B) lights having a first wavelength band or mixing R, G, and B lights having a second wavelength band.

13. A method for receiving a three dimensional (3D) image, the method comprising:
receiving, by a first glasses and a second glasses, a multi-image that is generated by combining a left-eye image and a right-eye image for different content of a plurality of content and transmitting different wavelengths of light for corresponding different content when the multi-image is provided; and
transmitting, by the first glasses and the second glasses, the multi-image as the left-eye and right-eye images,
wherein the transmitting the different wavelengths comprises transmitting the different wavelengths of the light by using a color filter.

14. The method for receiving a 3D image as claimed in claim 13, further comprising transmitting the different wavelengths of the light through the color filter as white light.

* * * * *